(No Model.) 2 Sheets—Sheet 2.
N. XENOS.
KENOTIPHONE OR KATOPTRIKUM.
No. 566,643. Patented Aug. 25, 1896.
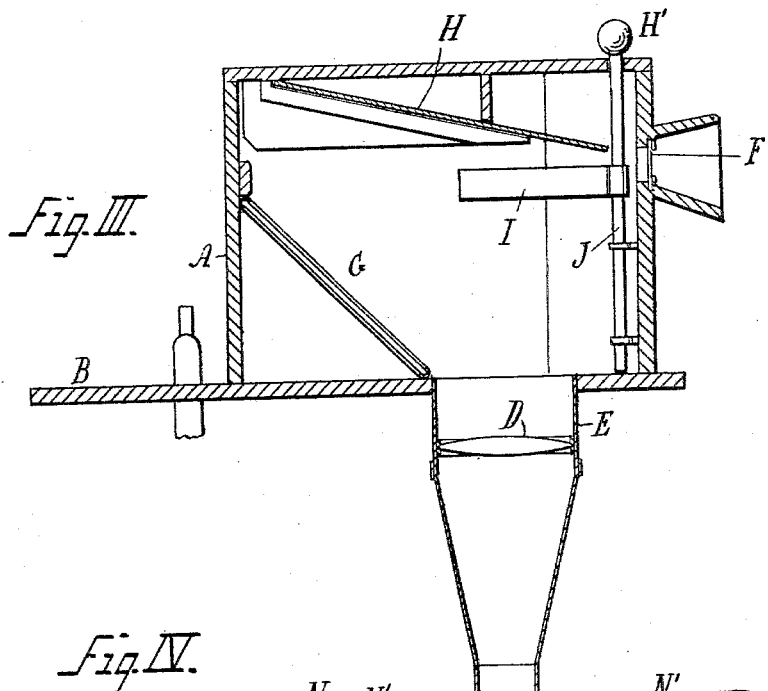
Fig. III.
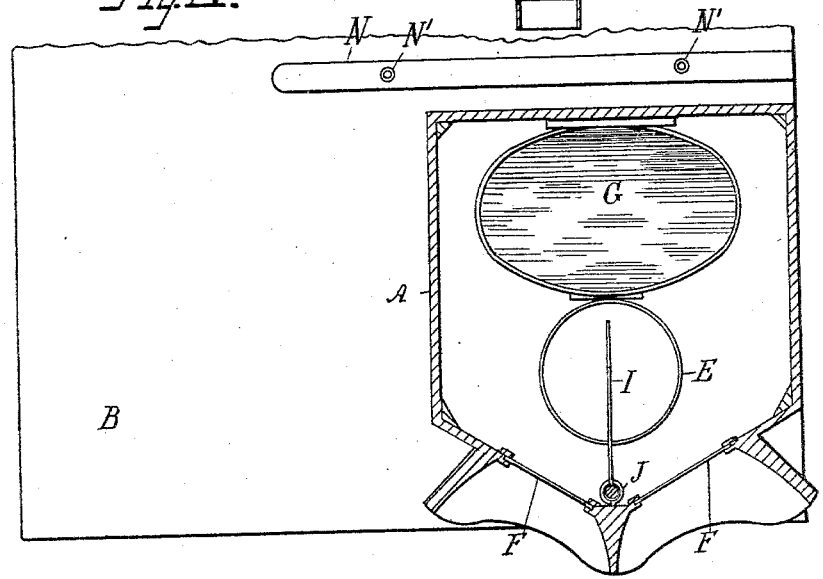
Fig. IV.
WITNESSES:
E. P. Whipple
Thomas Walker
INVENTOR
Nicholas Xenos
BY
Francis C. Bowen
ATTORNEY

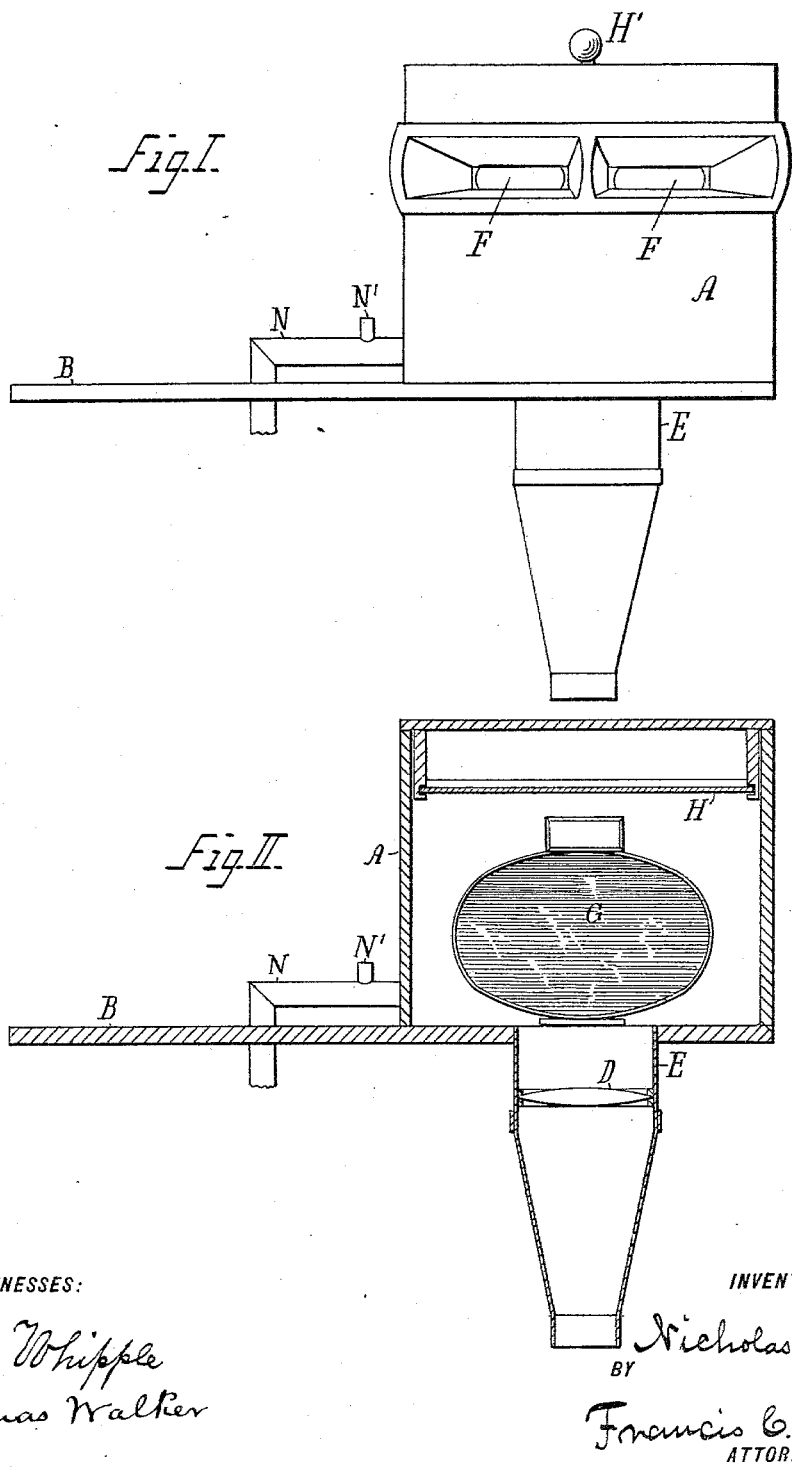

UNITED STATES PATENT OFFICE.

NICHOLAS XENOS, OF NEW YORK, N. Y.

KENOTIPHONE OR KATOPTRIKUM.

SPECIFICATION forming part of Letters Patent No. 566,643, dated August 25, 1896.

Application filed January 28, 1896. Serial No. 577,119. (No model.)

*To all whom it may concern:*

Be it known that I, NICHOLAS XENOS, a subject of the King of Greece, and a resident of New York, in the county of New York and State of New York, have invented certain new and useful Improvements in Kenotiphones or Katoptrikums, of which the following is a specification.

My invention is an apparatus for exhibiting pictures or other objects and which I denominate the "katoptrikum," the general object thereof being visually to represent the desired picture on an enlarged scale. I attain this object by a certain novel arrangement of mirrors in conjunction with a lens and sight-holes, as will be hereinafter more fully set forth.

In the accompanying drawings, Figure 1 represents a front view of an apparatus embodying my invention. Fig. 2 represents a vertical section thereof. Fig. 3 represents a like section taken at right angles to Fig. 2. Fig. 4 represents a horizontal section thereof on the line $x\ x$, Fig. 2.

Similar letters of reference indicate corresponding parts.

The letter A indicates a box of wood or other suitable material constituting the body of the apparatus, and B a platform supporting the same. This platform is to be mounted on legs or other support for raising the apparatus to a sufficient height for permitting the entrance of light through the lens D, which is inserted in the lower part thereof. This lens is secured in a cylinder E, introduced through a suitable opening in the base or platform B. At one side of the body A are sight-holes F, in this example two in number, and at a point opposite to these sight-holes within the body is a mirror G, while at a point within and next below the top of the body is a second mirror H. The two mirrors G H are inclined in relation to the lens D and lie at an angle to each other, as shown in Fig. 3, so that if the desired object is properly presented to the lens its image is first thrown upon the top mirror G and thence upon the side mirror H, from whence it may be readily viewed through the sight-holes F in the front of the box, the object thus being magnified to an extent of two or three times its original size.

In order to permit of shutting off either of the sight-holes F, I have arranged within the box A a blind or shutter I upon a spindle J, with a finger-button K' exteriorly of the box, so that by properly manipulating this button the blind may be adjusted alternately in relation to either of the sight-holes.

In connection with my apparatus I contemplate using a phonograph, and to this end I arrange on the base B a tube N, with suitable branches N' for the connection therewith of the desired instrument and to the ears of the user.

It may be remarked that the parts of my apparatus both as to its sight-holes and the phonograph-connecting medium may be duplicated, using one and the same base therefor.

One of the advantages of the apparatus is that the desired view may be obtained from a front in contradistinction to the top thereof, which obviously is a source of convenience to the user.

It may be remarked also that this apparatus is designed to be used in connection with the kenetiphone or kinetoscope.

What I claim as new, and desire to secure by Letters Patent, is—

The display apparatus comprising the box, the sight-holes in one side thereof, the lens in the bottom thereof, the inclined mirror in the side thereof opposite the sight-holes and the inclined mirror in the top thereof in fixed relation to the side mirror, the lens and the sight-holes, in combination with a shutter adapted to be adjusted in relation to either of the sight-holes, and a tube for connection with a phonograph, and a base common to said box and tube, substantially as shown and described.

NICHOLAS XENOS.

Witnesses:
M. E. CONSTANTINIDTS,
FRANCIS C. BOWEN.